June 17, 1930.　　　　P. KRUSE　　　　1,764,317
SAFETY CLUTCH
Filed Feb. 15, 1927　　　2 Sheets-Sheet 1
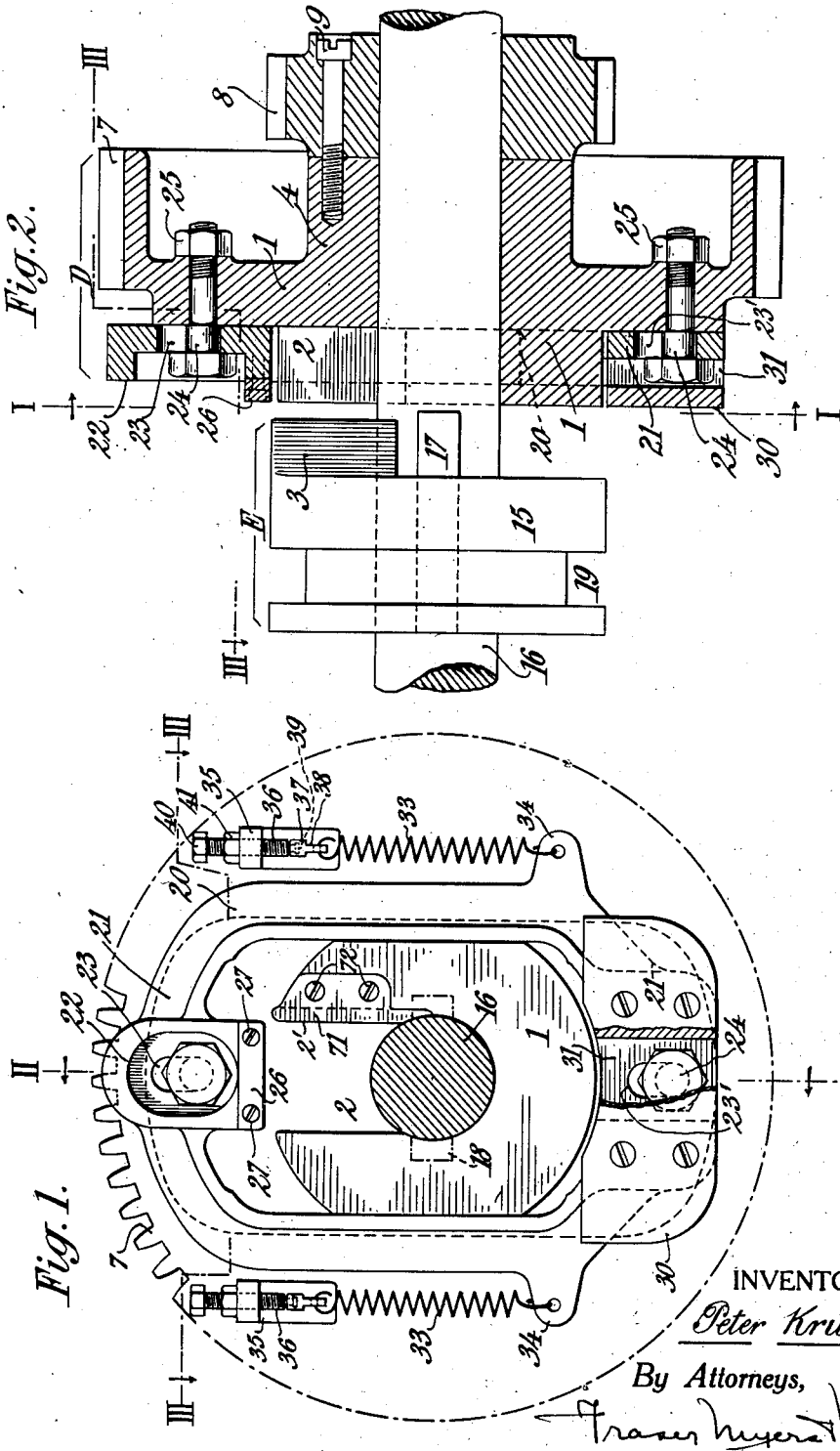
INVENTOR:
Peter Kruse,
By Attorneys,

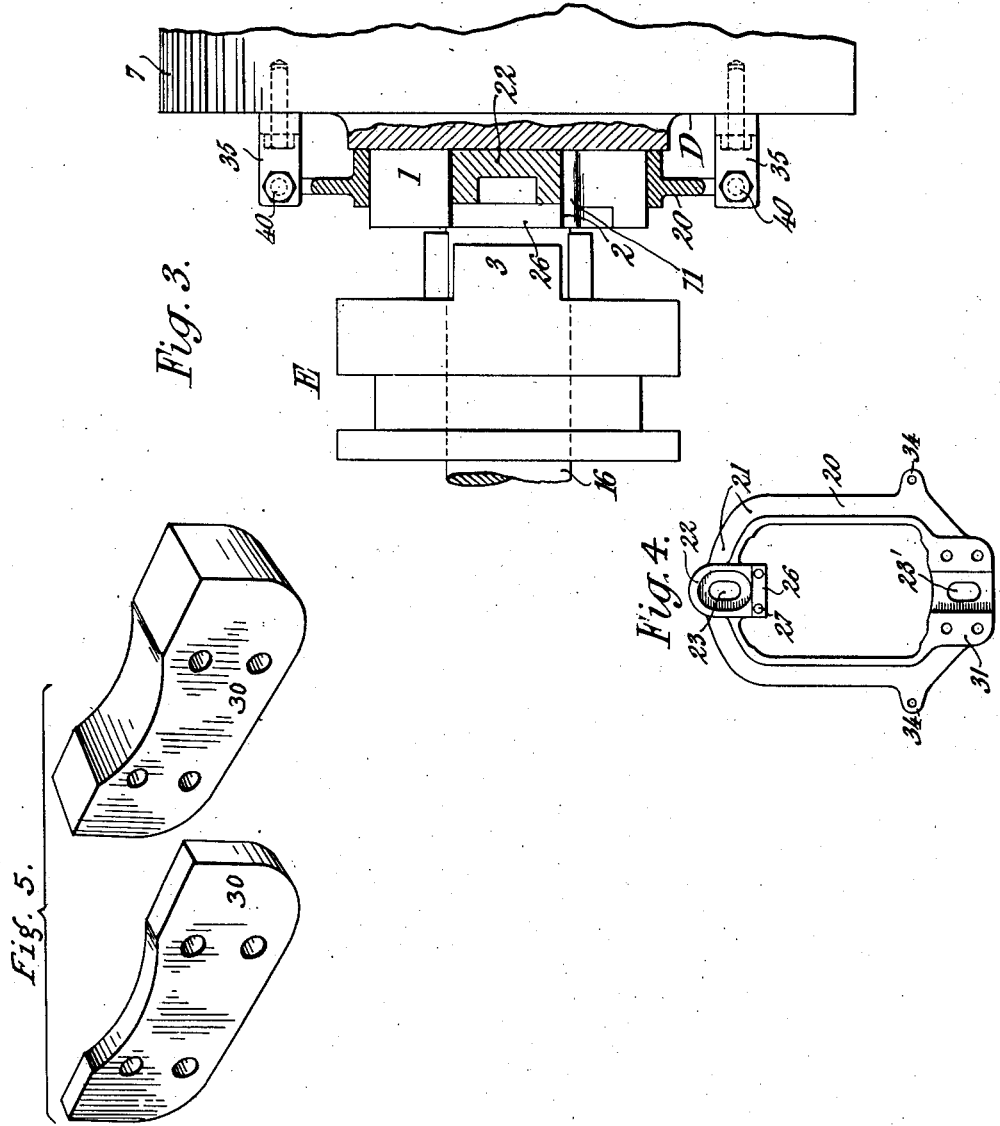

Patented June 17, 1930

1,764,317

UNITED STATES PATENT OFFICE

PETER KRUSE, OF BROOKLYN, NEW YORK, ASSIGNOR TO E. W. BLISS COMPANY, OF BROOKLYN, NEW YORK, A CORPORATION OF DELAWARE

SAFETY CLUTCH

Application filed February 15, 1927. Serial No. 168,343.

This invention relates to automatic safety clutches particularly adapted to prevent the engagement of a driving element with a driven element when the difference in speed between such elements is so great that a sudden mechanical coupling between them would result in excessive shock to the mechanism connected therewith.

This invention has for its object to provide a speed-controlled safety clutch which will positively prevent the coupling of driving and driven elements together when the difference in speed between them is excessive, and furthermore aims to provide a device of this nature which is rugged and simple, and which may be readily applied to existing clutches as an attachment, if desired.

A further object of the invention is to provide a safety clutch of the described type which can be readily adjusted so that the speed at which the driving and driven elements may be coupled together can be altered to meet the requirements of various drives.

Another object of the invention is to provide means whereby the safety element of the clutch may be locked in inoperative position so that, when desired, the driving and driven shafts may be coupled together at any speed, the said means being also adapted to lock the safety element in operative position so that the driving and driven elements may not be coupled together accidentally or by a person deliberately tampering with the machine.

Further objects of the invention will be set forth in connection with the following detailed description, reference being had to the accompanying drawings in which,—

Figure 1 is an end view of a conventional dog clutch equipped with the preferred form of my speed-controlled safety device;

Fig. 2 is a vertical axial section of the safety clutch shown in Fig. 1, taken along the section line II—II;

Fig. 3 is a horizontal fragmentary cross-section taken through the device shown in Fig. 1 along the section line III—III as viewed from above;

Fig. 4 is a view of the safety slide removed from the clutch, the view corresponding to Fig. 1;

Fig. 5 is a perspective view of the interchangeable governor weights.

There are many types of drives for heavy machinery which necessarily provide a rigid mechanical coupling between the power source and the machine driven thereby. Such devices, are, as a rule, far more durable than any type of friction coupling, require practically no attention, and are comparatively inexpensive. Furthermore, in certain drives it is essential to preserve perfect synchronism between driving and driven elements in order to co-ordinate the movements of different parts of a machine. The disadvantage of the conventional drive of this type is that the coupling between driving and driven elements is sudden. If the difference in speed between the elements to be coupled together is great, and the mass of the parts to be set in motion or accelerated is large, a severe shock is produced upon both the driving and driven elements when the two are coupled together.

Perhaps the most usual mechanical coupling for providing a positive drive is the dog clutch. This device has been generally adopted because of its simplicity.

According to the present invention a dog clutch or some other coupling device is provided with a centrifugally governed safety device which interferes with, or prevents, the coupling of the driving and driven elements when the difference in speed between such elements is above a predetermined number of revolutions per minute. The safety device is adjustable so that the maximum difference in speed between the two elements which will permit of engaging the clutch or coupling may be varied to suit the requirements of different machines. Obviously, certain light free-running machines can be suddenly coupled to a power shaft turning at a certain speed, without damage, where a heavy machine similarly coupled to the same shaft would be subjected to excessive strains which, in many cases, would result in mechanical failure of some part of the machine or its drive. The utility of a safety clutch device, according to the present invention, is so wide that it will not be necessary to describe any specific application of the device to a particular machine. The application of the device to a great variety of drives will readily occur to those skilled in the art.

The preferred embodiment of my safety clutch device is illustrated in Figs. 1, 2 and 3. Referring now to the drawings, and considering first Figs. 2 and 3, the driving element of a dog clutch is shown and generally referred to by the reference character D. The driven element E is shown to the left of the driving element. This clutch is of the conventional type, as far as the mechanical coupling between the driving and driven elements is concerned. The driving element D comprises a heavy metal block 1, the left-hand face of which is recessed to provide a slot 2, one side or shoulder 2' of which slot is engaged by the tongue or dog 3 of the driven element E. The main clutch block 1 is preferably provided with a hub portion 4 which affords a suitable bearing for the block.

The cylindrical clutch block illustrated provides exteriorly a ring gear 7 by which the clutch block 1 may be coupled with a part of the machine which it is desired to maintain in constant rotation whenever the clutch block 1 is rotating. Similarly, a gear 8 may be fastened to the end of the hub portion 4 of the clutch block as by means of machine screws 9. Obviously either of the gears 7 or 8 may be employed either to drive the clutch block 1 or to transmit power from said block.

In machines of various types it is oftentimes desired to stop a certain portion of the machine while permitting other parts to continue in motion. In the clutch illustrated everything coupled to the clutch block 1 through gears 7 and 8 will continue to rotate regardless of whether the driven member E of the clutch is engaged or disengaged from the driving member D. The portion of the mechanism connected to the driven member of the clutch may be stopped while the portions connected to the driving element continue to function.

The driven element E comprises preferably a cylindrical clutch member 15 slidably splined upon a driven shaft 16, the splines 17 on the driven shaft engaging slots 18 in the clutch member 15, as shown in Fig. 1. This clutch member 15 is provided with the usual annular shifter groove 19 into which may fit any usual form of clutch-shifting fork or similar device, the means for shifting a slidable dog clutch element being so well known as to require no further description or illustration. The tongue or dog 3, which is adapted to enter the recess 2 in the driving element D of the clutch, is preferably formed as a projection from and integrally with the driven member 15, and is designed to have sufficient strength to withstand the severe stresses to which such an element is necessarily subjected. It will be understood that the driven shaft 16 passes freely through the driving element D of the clutch and provides the bearing for such element. This construction is desirable because, when the driving and driven elements of the clutch are coupled together, such elements and the shaft 16 upon which they are mounted rotate in unison, thereby eliminating unnecessary wear and friction between the elements of the clutch and the shaft upon which they are mounted.

The automatic safety control, according to the present invention, may be carried out in a variety of ways. I have illustrated only a single embodiment, but it will be understood that this is merely illustrative, as other equivalent arrangements will readily occur to those skilled in the art.

In its preferred embodiment the safety device, as illustrated in Figs. 1, 2, 3 and 4, comprises a slide 20 symmetrically disposed on the smooth face of the clutch block 1, this block being the driving element of the clutch. The slide 20 preferably is constructed in a generally rectangular form, the two long sides thereof being connected together at either end by bridge-like end pieces 21 (see Fig. 4). The slide, as thus constructed, provides virtually a frame having a central opening sufficiently large to permit the passage of the driven member E of the clutch therethrough when the slide is in the position shown in Fig. 1. In the middle of the upper slide end piece is formed, preferably integrally with the slide, an elongated receptacle 22. The bottom of this receptacle has a slot 23, and in the opposite slide end piece a similar slot 23' is provided. Bolts 24 passing freely through slots 23, 23' and screwed into clutch block 1 provide the guiding means for retaining the slide 20 in position on the face of the clutch block, while permitting its free oscillatory movement along a vertical line, as indicated in Fig. 1. The bolts 24 pass entirely through the clutch block and carry at their right-hand ends lock-nuts 25, which tighten against the clutch block 1. As will hereinafter be more fully set forth, the bolt 24 shown at the top of Fig. 2 also serves as a means for locking the safety device either in inoperative position or in a position where it will continuously prevent the engagement of the driving and driven elements of the clutch.

At the lower extremity of the member forming the receptacle 22 a shoe 26 is mounted, which may be held in place by screws 27, as indicated, thereby rendering the shoe readily replaceable. This shoe is of such shape that, upon a downward movement of the slide 20, the shoe will freely slide within the slot 2, thereby effectively blocking the entrance of the dog 3. The shoe 26, when it is moved into the driving slot 2 formed in clutch member 1, provides a detent or barrier which absolutely prevents the driven element E of the clutch from being manually shifted into engagement with the driving element D. On the other hand, when the slide 20 is moved so as to withdraw the shoe from the driving slot or recess 2, the two elements of the clutch may be freely engaged, as hereinbefore set forth.

The movement of the slide 20 is automatically controlled in accordance with the speed of the driving member of the clutch. This is accomplished by so disposing the center of mass of slide 20 that it is below the axis of rotation when the slide is in the position shown in Fig. 1. To sufficiently displace the center of mass so that the effect of centrifugal force will be adequate to positively control the movement of the slide, a heavy plate 30 may be screwed securely to the raised portions 31 of the slide surrounding the head of bolt 24 at the lower side of the clutch. This plate also provides a shield to prevent access to the bolt beneath it, which, when once adjusted to permit the free movement of slide 20, should not again be touched, except when repairs or replacements are necessary.

As the center of mass of slide 20 is below the center of rotation, as shown in Fig. 1, the tendency of the slide, upon rotation of the driving element of the clutch, will be to shift, so that the end which in the figure is shown at the bottom, will tend to move radially outward. In so doing, the shoe 26 will be moved into the inner position where it will effectively prevent the coupling of the clutch elements together. The movement of the slide under the action of centrifugal force is resisted by means of springs 33, which engage ears 34 projecting on opposite sides from the lower part of the slide. The upper ends of these springs are adjustably secured to the main clutch block 1 by means of brackets 35 and adjusting screws 36. The springs are hooked into swiveled collars 37 having depending lugs 38, the said collars being attached to the lower ends of screws 36 as by means of screws 39.

The adjusting screws 36 are threaded into the outwardly-projecting portions of brackets 35, and are provided at their upper ends with hexagonal heads 40 by which the screws are turned. Lock-nuts 41 may be tightened against the brackets 35 to more permanently maintain the adjustment of tensioning screws 36.

The above-described screw-tensioning device affords a means for readily adjusting the stress on springs 33 which oppose the resultant action of centrifugal force upon the slide 20. By variably tensioning these springs analogous to the adjustment of any spring-ballasted governor means the number of R. P. M. at which the slide will shift from the inoperative position to the operative or safety position can be varied. In one type of drive, for example, it may be perfectly safe to permit the coupling of the clutch elements together when the speed of the driving shaft is 300 R. P. M. Assume that the safety clutch has been adjusted so that above this speed the slide will bring the shoe 26 into the safety position where it will block the engagement of the clutch elements. Below this speed the tension of springs 33 is sufficiently great to overcome the action of centrifugal force upon the slide, and the shoe 26 will be withdrawn from the clutch slot 2, thereby permitting free coupling of the clutch elements.

If it should be desired to alter the adjustment of the clutch so that the driving and driven elements could not be coupled together above a speed of 150 R. P. M., adjusting screws 36 need simply be screwed in further so as to relieve to a certain extent the tension on springs 33. With reduced spring tension, the centrifugally governed mass of slide 20 will be able to cause a movement of the slide toward the safety position at a reduced speed of the driving element. The correct tension of the springs 33 for any desired timing of the clutch may be readily determined by trial. Should the spring adjustment not be adequate to take care of the range of speeds over which it may be desired, in various machines, to operate the clutch, an additional speed range can be readily provided by substituting for the plate 30 another plate of greater or less weight, depending upon whether the speed at which the slide is desired to shift to the safety position is below or above the range of speeds provided for by the adjustment of the tension of springs 33. The plate 30 may be duplicated by one or more of the same design except for the thickness of the material as shown in Fig. 5, and such plates may be used singly or in combination to give any desired weight and centrifugal action to the governor mass.

The operation of the safety clutch, hereinbefore described, will be obvious without further explanation. The clutch proper is a simple dog clutch, and is provided with a centrifugally-controlled safety slide which, above a pre-determined number of R. P. M. of the driving element of the clutch, moves into a position which prevents the coupling of the clutch elements together. Below this critical speed the springs 33 maintain the safety device in such position that the clutch elements may be freely coupled at the will of the operator.

If it is desired to render the safety device inoperative, it is only necessary to clamp the slide 20 in the inoperative position by tightening the bolt 24 against the slide. On the other hand, the safety slide may, by the same means, be clamped in its operative position, thereby rendering it impossible to engage the elements of the clutch at any speed. This is sometimes useful where it is desired to prevent the accidental starting of a machine, as, for instance, while the machine or certain parts thereof are being repaired. The position of the head of bolt 24 within the walls of receptacle 22 practically prevents anyone from either locking or releasing the safety slide by tampering with the mechanism.

It will be apparent to those skilled in the art that the safety device according to the present invention is applicable to a great variety of mechanical couplings other than dog clutches, and indeed, the device may be applied to any rotary drive in which the mechanical engagement of driving and driven elements should be prevented when the difference in speed between the two elements exceeds a predetermined number of R. P. M.

While only one embodiment of the present invention has been described and illustrated, it is to be understood that the invention is not limited thereto but may be otherwise variously modified and embodied without departing from the spirit thereof, as set forth in the following claims.

What I claim is:

1. A safety clutch mechanism comprising a positive rotary mechanical coupling device, a frame slidably mounted on the driving element of said device, the driven element of said device being adapted to engage the said driving element through an opening in said frame when the frame is in one position, said frame in another or safety position being adapted to prevent the engagement of said elements, yielding means tending to move said frame towards the said first-mentioned position, and the mass associated with said frame tending under the action of centrifugal force to move said frame into the opposite or safety position.

2. A safety clutch mechanism, comprising driving and driven elements having parts which may be manually engaged to couple said elements together, and centrifugally-governed means to prevent the engagement of said parts above a predetermined number of revolutions of one of the said elements, said means comprising a slide carried by such element, said slide having a center of mass eccentric to the axis of rotation of the clutch, the slide being disposed so that in one position it interferes with the engagement of said clutch elements and in another position it permits such engagement.

3. A safety clutch mechanism, comprising a mechanical coupling device for positively connecting and disconnecting a rotary driving element and a driven element, and safety stop means including a slide mounted upon the driving element and having a part which in the safety position prevents the coupling of the said elements, the mass associated with said slide being acted upon by centrifugal force tending to move the slide to the safety position, and a spring opposing such motion of the slide.

4. A safety clutch mechanism comprising driving and driven elements, one of said elements carrying a projection, the other of said elements having a shoulder which may be engaged by said projection whereby said elements are coupled in driving relationship, and centrifugally-governed means sensitive to the speed of the driving element adapted to prevent the engagement of said projection with said shoulder when the speed of the driving element exceeds a predetermined number of R. P. M., said centrifugally-governed means comprising a slide carried by the driving element of the clutch, said slide having a center of mass eccentric to the axis of rotation of the clutch and being disposed so that in one position it interferes with the engagement of said projection with said shoulder and in another it permits the engagement of said projection with said shoulder.

5. A safety clutch mechanism comprising a dog clutch, spring-ballasted governor means associated with the driving element of said clutch, a detent actuated by said governor means, said detent being adapted in operative position to prevent the driving engagement of the driving and driven elements of the clutch, the said governor means being adapted, upon exceeding a predetermined speed, to move the detent into said operative position, and locking means adapted to hold said detent in operative position whereby, when desired, the accidental engagement of the clutch may be prevented regardless of the speed.

6. A safety clutch mechanism, comprising a dog clutch, spring-ballasted governor means associated with the driving element of said clutch, a detent actuated by said governor means, said detent being adapted in operative position to prevent the driving engagement of the driving and driven elements of the clutch, the said governor means being adapted, upon exceeding a predetermined speed, to move the detent into said operative position, and manually set locking means adapted to hold said detent either in the said operative position or in inoperative position.

In witness whereof, I have hereunto signed my name.

PETER KRUSE.